United States Patent
Ho et al.

(10) Patent No.: US 7,649,711 B2
(45) Date of Patent: Jan. 19, 2010

(54) DOUBLE NOTCHED SHIELD AND POLE STRUCTURE FOR STRAY FIELD REDUCTION IN A MAGNETIC HEAD

(75) Inventors: Kuok San Ho, Santa Clara, CA (US); Yimin Hsu, Sunnyvale, CA (US); Ching Hwa Tsang, Santa Clara, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 154 days.

(21) Appl. No.: 10/977,446

(22) Filed: Oct. 29, 2004

(65) Prior Publication Data

US 2006/0092566 A1   May 4, 2006

(51) Int. Cl.
G11B 5/147 (2006.01)
(52) U.S. Cl. ............................ 360/125.13; 360/125.19; 360/125.64
(58) Field of Classification Search ............... 360/122, 360/125, 126, 235.4, 236.4, 236.5, 125.03, 360/125.09, 125.1, 125.13, 125.14, 125.19, 360/125.2, 125.46, 125.47, 125.51, 125.52, 360/125.59, 125.6, 125.64, 125.65
See application file for complete search history.

(56) References Cited

U.S. PATENT DOCUMENTS

| | | | | |
|---|---|---|---|---|
| 5,200,056 A | * | 4/1993 | Cohen et al. | 205/122 |
| 5,680,283 A | * | 10/1997 | Tanaka et al. | 360/125 |
| 5,986,856 A | | 11/1999 | Macken et al. | 360/113 |
| 5,995,341 A | * | 11/1999 | Tanaka et al. | 360/125 |
| 6,055,137 A | * | 4/2000 | Ishiwata et al. | 360/317 |
| 6,074,767 A | * | 6/2000 | Lin | 428/811.2 |
| 6,097,578 A | | 8/2000 | Pokhil | 360/319 |
| 6,122,144 A | * | 9/2000 | Chang et al. | 360/122 |
| 6,230,389 B1 | | 5/2001 | Zhu | 29/603.1 |
| 6,304,415 B1 | * | 10/2001 | Tateyama et al. | 360/125.43 |
| 6,327,116 B1 | * | 12/2001 | Watanabe et al. | 360/125.65 |
| 6,333,841 B1 | | 12/2001 | Sasaki | 360/317 |
| 6,373,657 B1 | * | 4/2002 | Kamijima | 360/126 |
| 6,411,464 B1 | * | 6/2002 | Fujii et al. | 360/122 |

(Continued)

FOREIGN PATENT DOCUMENTS

EP    1647973 A2    4/2006

OTHER PUBLICATIONS

EPO Communication and Search Report from European Application No. 05254252.9-2210 mailed on Aug. 20, 2007.

*Primary Examiner*—Brian E Miller
(74) *Attorney, Agent, or Firm*—Zilka-Kotab, PC

(57) ABSTRACT

A double notched magnetic structure for use in a magnetic head for avoiding stray field writing. The structure could be a magnetic shield, magnetic pole of a write head or some other magnetic structure used in a magnetic head of a magnetic recording system, and has notches formed at both the front end (adjacent to the ABS) and at the back end (away from the ABS). The notches at the front end form a forward protruding portions that performs the necessary function of the structure, such as magnetic shielding, and has laterally extending recessed portions (recessed by the front notches) that move the flux focal points of the structure away from the ABS to avoid stray field writing. The back notches form a backward extending portion that affects the geometry of the structure to prevent the focusing of magnetic flux caused by stray magnetic fields having a component perpendicular to the ABS.

20 Claims, 7 Drawing Sheets

U.S. PATENT DOCUMENTS

| | | | |
|---|---|---|---|
| 6,459,543 B1 | 10/2002 | Sasaki | 360/126 |
| 6,473,265 B1 | 10/2002 | Zhou et al. | 360/126 |
| 6,490,127 B1 * | 12/2002 | Sasaki | 360/125.57 |
| 6,589,436 B1 * | 7/2003 | Tabib et al. | 216/52 |
| 6,603,637 B1 * | 8/2003 | Segar et al. | 360/122 |
| 6,608,735 B1 * | 8/2003 | Serpe et al. | 360/236.4 |
| 6,624,971 B1 * | 9/2003 | Sasaki | 360/125.51 |
| 6,826,014 B2 * | 11/2004 | Lam et al. | 360/125.53 |
| 6,965,496 B2 * | 11/2005 | Yamanaka | 360/125.44 |
| 7,113,366 B1 * | 9/2006 | Wang et al. | 360/125.46 |
| 7,133,255 B2 * | 11/2006 | Lille et al. | 360/125.56 |
| 7,142,392 B2 * | 11/2006 | Ohtomo et al. | 360/125.43 |
| 2002/0027750 A1 | 3/2002 | Shukh et al. | 360/317 |
| 2002/0036497 A1 * | 3/2002 | Inage et al. | 324/252 |
| 2002/0163759 A1 * | 11/2002 | Kanada et al. | 360/126 |
| 2002/0187430 A1 * | 12/2002 | Watanabe | 430/311 |
| 2003/0021064 A1 * | 1/2003 | Ohtomo et al. | 360/126 |
| 2003/0099069 A1 * | 5/2003 | Kagami et al. | 360/313 |
| 2004/0061976 A1 * | 4/2004 | Nakayama | 360/313 |
| 2005/0002124 A1 * | 1/2005 | Bunch et al. | 360/122 |
| 2005/0264930 A1 * | 12/2005 | Gider et al. | 360/125 |

* cited by examiner

DOUBLE NOTCHED SHIELD AND POLE STRUCTURE FOR STRAY FIELD REDUCTION IN A MAGNETIC HEAD

FIELD OF THE INVENTION

The present invention relates to current perpendicular magnetic recording and more particularly to a novel magnetic shield design having reduced stray field sensitivity.

BACKGROUND OF THE INVENTION

The present invention is related to the following commonly assigned patent applications: Winged Design For Reducing Corner Stray Magnetic Fields; Single Notched Shield and Pole Structure With Slanted Wing For Perpendicular Recording; and Winged Pole and Shield Structure for Reduced Stray Field in a Perpendicular Write Head.

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One problem that has arisen as a result of such perpendicular recording systems is that the magnetic medium is particularly susceptible to stray magnetic fields. Relatively large magnetic structures such as the magnetic shields used magnetically isolate the read sensor act as large magnetic antennas. As magnetic antennas, these structures collect and concentrate magnetic fields from a myriad of extraneous, external sources, such as cellular phones, airport security devices and many other such sources.

The magnetically soft underlayer of the medium in a perpendicular magnetic recording system is particularly susceptible to picking up magnetic fields emanating from such magnetic structures. This phenomenon can be understood more clearly with reference to FIG. 1, which shows a magnetic structure 102 which could be for example a magnetic shield or some other structure such as a magnetic pole of a write head. The magnetic structure 102 acts as a magnetic antenna, collecting the extraneous magnetic fields, indicated by field lines 104. This causes a resulting magnetic flux within the magnetic structure, the magnetic flux being represented by flux lines 106. As those skilled in the art will appreciate the lines 104 depict magnetic fields as they travel through space, whereas the lines 106 indicate a resulting magnetic flux traveling through a magnetic medium such as the structure 102. It should be pointed out that, while the flux 106 is being described as resulting from a vertical field, a similar result would occur as from the presence of a field canted at some other angle.

The magnetic flux 102 becomes highly concentrated at the corners of the magnetic structure 102. As a result, a concentrated magnetic field 106 emits from the corners of the magnetic structure 102 traveling to the soft underlayer 108 of the nearby magnetic medium 110. The soft magnetic properties of the magnetically soft underlayer, cause it to strongly attract and absorb magnetic fields. In fact an environmental stray field of just 50 Gauss can result in a field 106 as large as 6000 Gauss being emitted from the magnetic structure 102 While traveling to the soft underlayer 108, this concentrated magnetic field 106 passes through the magnetically hard top layer 112, and in the processes magnetizes the top layer 112. By doing so, the magnetic field 106 completely erases any data that may have been previously recorded on the top layer 112. As can be appreciated, this is very problematic.

Although magnetic structures such as magnetic shields and magnetic poles exhibit the problem described above, such magnetic structures are a necessary part of magnetic recording head and cannot simply be eliminated. Therefore, there is a strong felt need for a design for magnetic structures that can allow efficient performance of the magnetic structure for its intended purpose (such as a magnetic shield) while avoiding such unwanted stray field writing. Such a solution to the above problem would preferably not involve the addition of significant processes complexity and would allow the use of currently available desired magnetic materials.

SUMMARY OF THE INVENTION

The present invention provides a magnetic structure for use in a magnetic head. The structure has a back edge, located away from the ABS, that has at least one discontinuity such as a step or a notch.

The structure preferably includes first and second notches that define a stepped up backward extending portion formed therebetween. The notches preferably extend to the outer ends of the magnetic structure.

The configuration of the back end of the magnetic structure makes the structure exceptionally resistant to stray field writing, and makes the structure especially with regard to extraneous magnetic fields having a component in a direction perpendicular to the ABS.

The magnetic structure may also have a front edge (at the ABS side) that has third and fourth notches that define a forward extending portion therebetween. In this sense the structure is double notched in that it has notches formed at both the front and back edges. The front notches preferably extend from the forward extending portion to the outer ends of the structure, resulting in recessed portions (recessed from the ABS) that extend from the forward extending portion to the outer ends of the structure.

The forward extending portion may be a functioning portion of a structure such as a magnetic shield or a magnetic pole of a write element, and may extend to and be exposed at the ABS or may be recessed somewhat from the ABS. Both the forward extending portion and the backward extending portion are preferably formed at the center of the structure, but may also be offset at some other location. The recessed portions formed at the front edge of the structure, may be tapered such that they slope backward away from the ABS as they extend laterally outward.

The double notched design of the magnetic structure makes the structure extremely resistant to stray field writing from stray magnetic fields having components both perpendicular to the plane of the ABS and parallel with the plane of the ABS.

The invention is helpful in reducing the concentration of flux (and thus the fields) at the corners that are exposed on the active surface of the head. The overall geometry and magnetic properties of the head structure and soft underlayer are the other factors that determine the absolute fields that appear at these corners and that are induced in response to write-current and/or external field. The relative sensitivities to write current and to external field components along various directions can be adjusted by changing the geometry of the head structure. For example, wider wings tend to decrease (improve) sensitivity to 'cross-track' external fields but increase (aggravate) sensitivity to "perpendicular" external fields. The ability to make such trade-offs by tuning the geometry of the head structure is also very important in maximizing overall robustness of the recording system against external fields.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
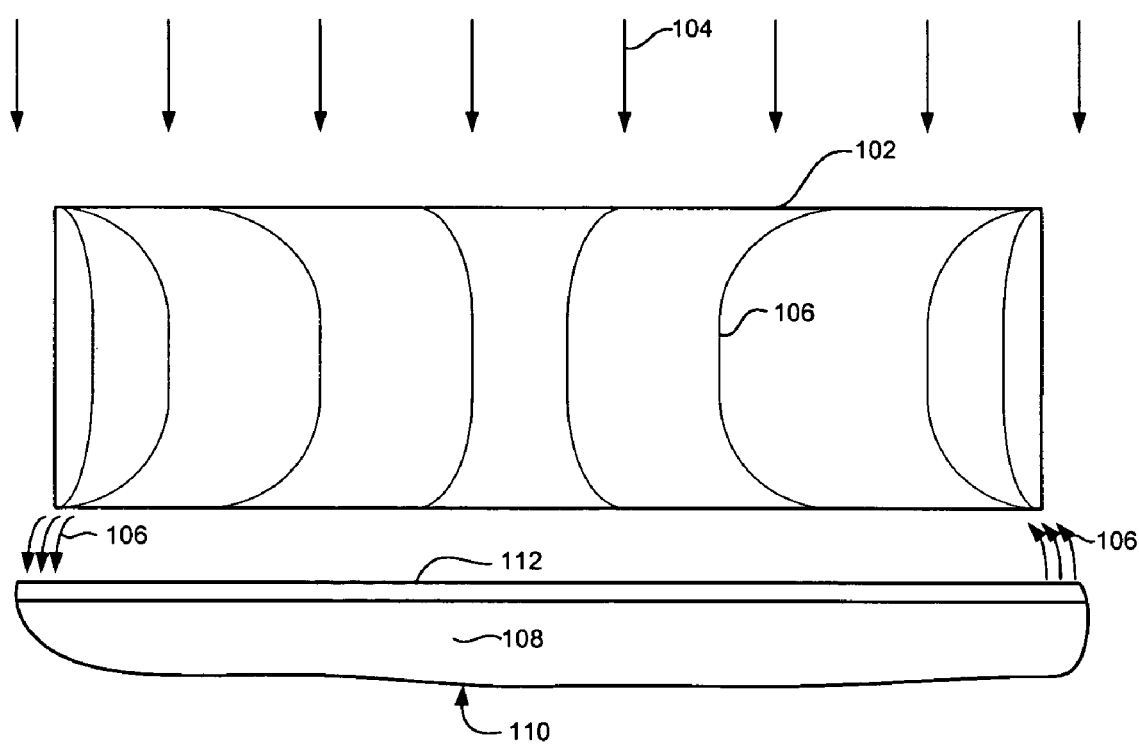
FIG. 1 is a view of a magnetic structure illustrating the effect of an environmental magnetic field on the magnetic structure and adjacent magnetic medium.
Figure 2:
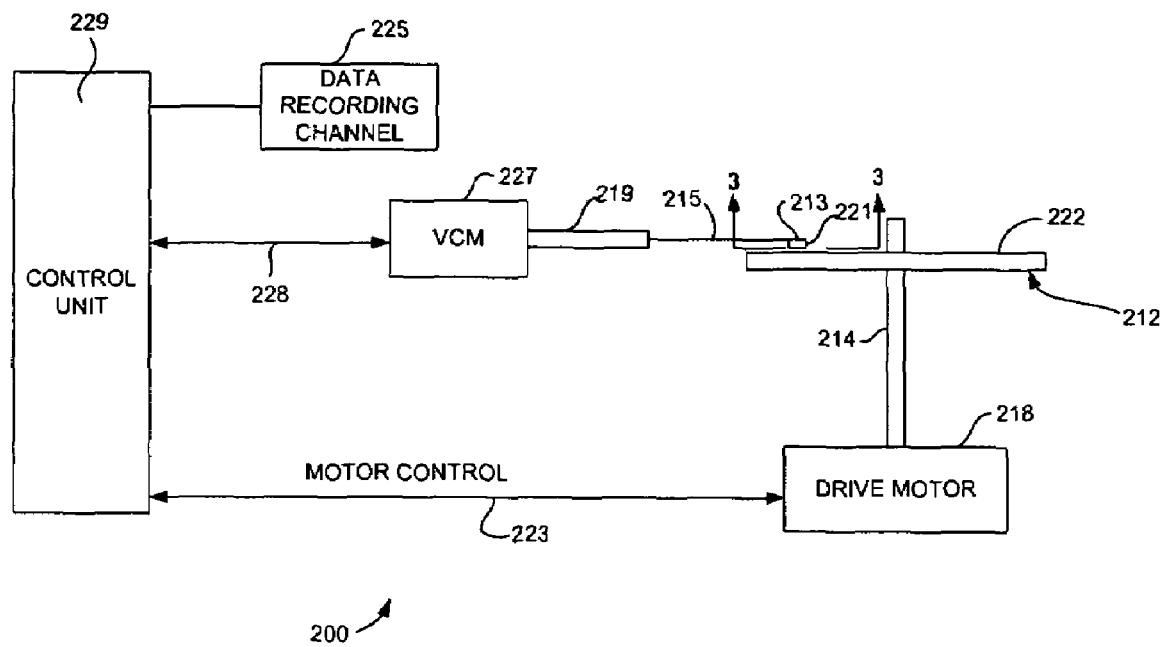
FIG. 2 is a schematic illustration of a disk drive system in which the invention might be embodied.

Referring now to FIG. 2, there is shown a disk drive 200 embodying this invention. As shown in FIG. 2, at least one rotatable magnetic disk 212 is supported on a spindle 214 and rotated by a disk drive motor 218. The magnetic recording on each disk is in the form of annular patterns of concentric data tracks (not shown) on the magnetic disk 212.

At least one slider 213 is positioned near the magnetic disk 212, each slider 213 supporting one or more magnetic head assemblies 221. As the magnetic disk rotates, slider 213 moves radially in and out over the disk surface 222 so that the magnetic head assembly 221 may access different tracks of the magnetic disk where desired data are written. Each slider 213 is attached to an actuator arm 219 by way of a suspension 215. The suspension 215 provides a slight spring force which biases slider 213 against the disk surface 222. Each actuator arm 219 is attached to an actuator means 227. The actuator means 227 as shown in FIG. 2 may be a voice coil motor (VCM). The VCM comprises a coil movable within a fixed magnetic field, the direction and speed of the coil movements being controlled by the motor current signals supplied by controller 229.

During operation of the disk storage system, the rotation of the magnetic disk 212 generates an air bearing between the slider 213 and the disk surface 222 which exerts an upward force or lift on the slider. The air bearing thus counter-balances the slight spring force of suspension 215 and supports slider 213 off and slightly above the disk surface by a small, substantially constant spacing during normal operation.

The various components of the disk storage system are controlled in operation by control signals generated by control unit 229, such as access control signals and internal clock signals. Typically, the control unit 229 comprises logic control circuits, storage means and a microprocessor. The control unit 229 generates control signals to control various system operations such as drive motor control signals on line 223 and head position and seek control signals on line 228. The control signals on line 228 provide the desired current profiles to optimally move and position slider 213 to the desired data track on disk 212. Write and read signals are communicated to and from write and read heads 221 by way of recording channel 225.

Figure 3:
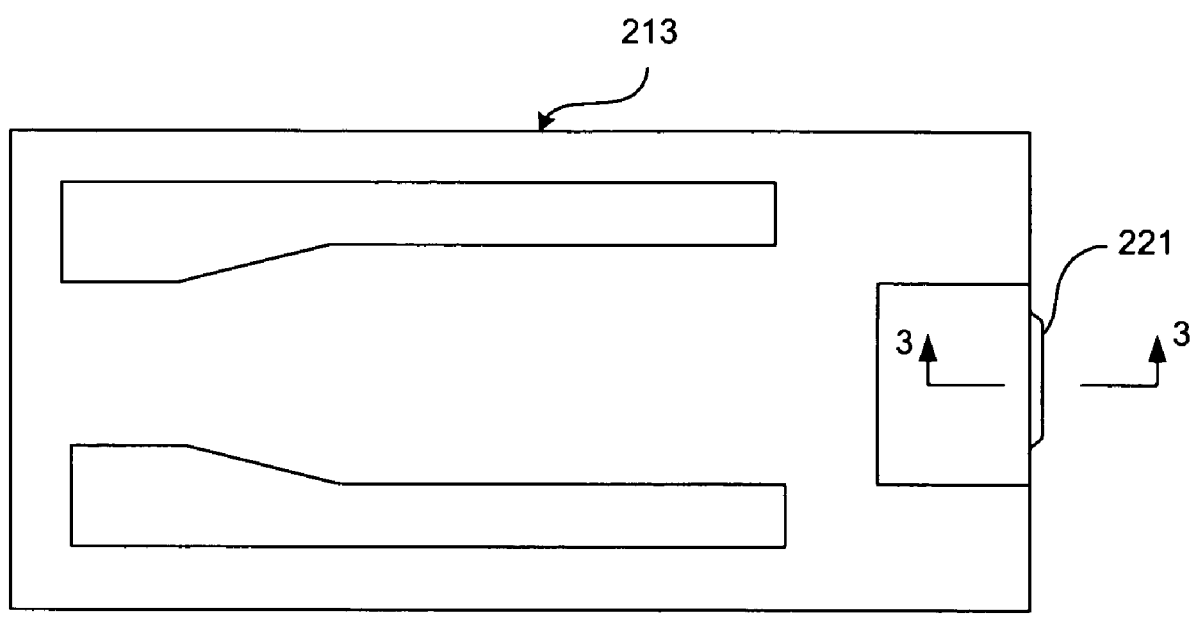
FIG. 3 is an ABS view of a slider, taken from line 3-3 of FIG. 2, illustrating the location of a magnetic head thereon.

With reference to FIG. 3, the orientation of the magnetic head 221 in a slider 213 can be seen in more detail. FIG. 3 is an ABS view of the slider 213, and as can be seen the magnetic head including an inductive write head and a read sensor, is located at a trailing edge of the slider. The above description of a typical magnetic disk storage system, and the accompanying illustration of FIG. 2 are for representation purposes only. It should be apparent that disk storage systems may contain a large number of disks and actuators, and each actuator may support a number of sliders.

Figure 4:
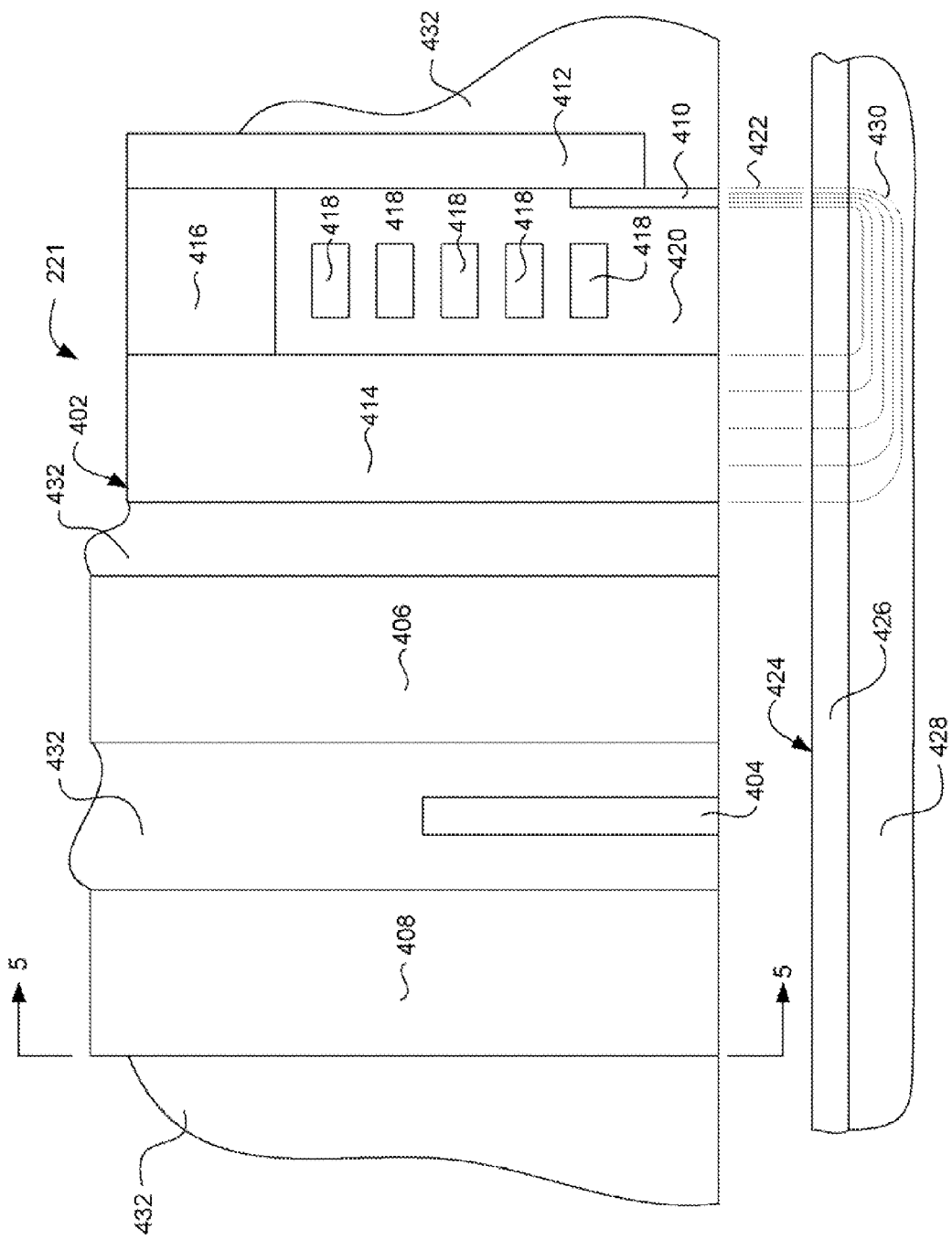
FIG. 4 is an ABS view, taken from line 4-4 of FIG. 3 and rotated 180 degrees, of a magnetic head according to an embodiment of the present.

With reference now to FIG. 4, the magnetic head 221 for use in a perpendicular magnetic recording system is described. The head 221 includes a write element 402 and a read sensor 404. The read sensor is preferably a giant magnetoresistive (GMR) sensor and is preferably a current perpendicular to plane (CPP) GMR sensor. CPP GMR sensors are particularly well suited for use in perpendicular recording systems. However, the sensor 404 could be another type of sensor such as a current in plane (CIP) GMR sensor or, a tunnel junction sensor (TMR) or some other type of sensor. The sensor 404 is located between and insulated from first and second magnetic shields 406, 408. The magnetic shields, which can be constructed of for example CoFe or NiFe, absorb magnetic fields, such as those from uptrack or down track data signals, ensuring that the read sensor 404 only detects the desired data track located between the shields 406, 408.

With continued reference to FIG. 4, the write element 402 includes a write pole 410, that is magnetically connected with a magnetic shaping layer 412. The write pole has a small cross section at the air bearing surface ABS and is constructed of a material having a high saturation, high moment magnetic material such as Co or CoFe. The shaping layer 412 is constructed of a magnetic material such as CoFe or NiFe and has a cross section parallel to the ABS surface that is significantly larger than that of the write pole 410.

The write element 402 also has a return pole 414 that preferably has a surface exposed at the ABS surface and has a cross section parallel with the ABS surface that is much larger than that of the write pole 410. The write pole 410 is magnetically connected with the shaping layer 412 by a back gap portion 416. The return pole 414 and back gap 416 can be constructed of, for example, NiFe, CoFe or some other magnetic material.

An electrically conductive write coil 418, shown in cross section in FIG. 4, passes through the write element 402 between the shaping layer 412, and the return pole 414. The write coil 418 is surrounded by an electrically insulating material 420 that electrically insulates the turns of the coil 418 from one another and electrically isolates the coil 418 from the surrounding magnetic structures 410, 412, 416, 414. When a current passes through the coil 418, the resulting magnetic field causes a magnetic flux to flow through the return pole 414, back gap 416, shaping layer 412 and write pole 410. This magnetic flux causes a write field 422 to be emitted toward an adjacent magnetic medium 424. As described in the background of the invention, the magnetic medium preferably includes a thin magnetically hard top layer 426 and a magnetically softer underlayer 428. The strong, highly concentrated magnetic field from the write pole 410 magnetizes, (ie. fixes the magnetic moment of) the magnetically hard top layer 426, and the resulting magnetic flux 420 travels through the soft underlayer 428. The flux travels to the return pole 414 where it passes back through the magnetically hard top layer 426 toward the return pole 414. As the magnetic flux 430 passes through the top layer 426 to the return pole 414, it is sufficiently spread out and week so as not to affect the magnetization of the magnetically hard top layer 424.

With continued reference to FIG. 4, the areas surrounding the write element 402, shields 406, 408 and the magnetoresistive read element are filled with a non-magnetic, electrically insulating material 432, such as for example alumina ($Al_2O_3$). This insulating material 432 can be formed in multiple layers.

Figure 5:
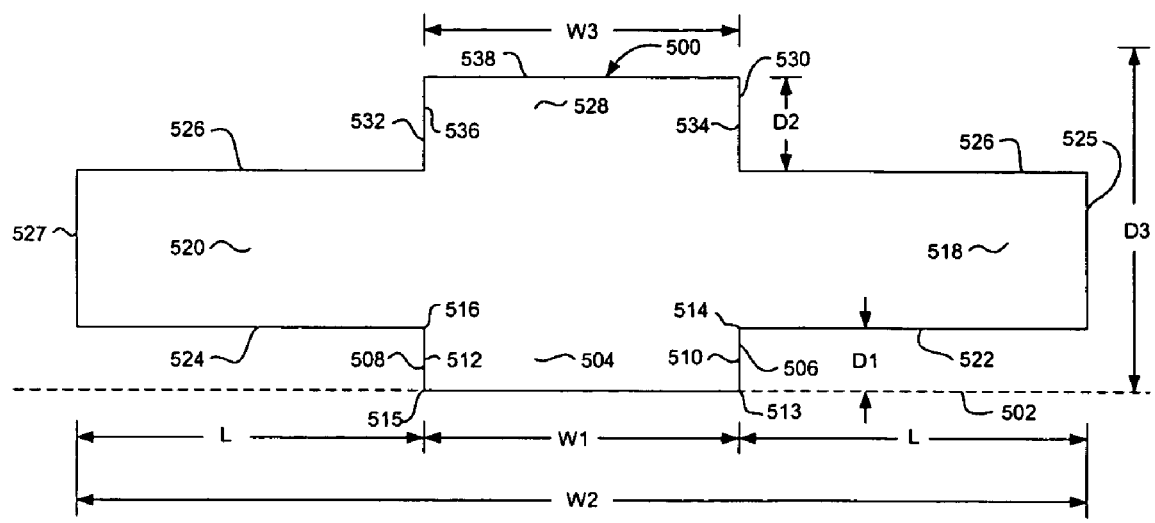
FIG. 5 is a view, taken from line 5-5 of FIG. 4, shown enlarged, of a magnetic structure according to a possible embodiment of the invention.

With reference now to FIG. 5, a magnetic structure 500 having improved resistance to stray field writing is described. The magnetic structure can be for example a magnetic shield 406, 408 (FIG. 4), magnetic return pole 414 (FIG. 5) or any other necessary magnetic structure that might be present in a magnetic head 221 having an air bearing surface (ABS) indicated by dashed line 502. The problem of stray field writing is particularly acute with regard to magnetic shields, since they are by their nature designed to absorb magnetic fields from their surroundings. Therefore, for purposes of clarity the magnetic structure will be described in terms of a magnetic shield 500, although it should be understood that the magnetic structure 500 could be any magnetic structure.

As discussed above in the background of the invention, environmental magnetic fields, which can be caused by many different sources such as airport security equipment or cellular phones, result in magnetic flux which flows through the shield 500. The flow of magnetic flux through a magnetic structure is strongly affected by the geometry of such of a structure. Lines of flux become greatly concentrated at abrupt features, especially corners of a magnetic structure. Prior art magnetic shields, which have had generally rectangular configurations with sharp corners located near the ABS have exhibited strong concentration of magnetic flux near the ABS, which has resulted in magnetic fields being emitted from these corners toward a nearby magnetic medium. This has resulted in stray field writing and the complete erasure of magnetic signal from portions of the magnetic medium. A rectangular shaped structure having a straight or flat back edge (away from the ABS) makes a structure particularly susceptible to focusing stray fields having a vertical component such as in the manner described in the background of the invention.

With continued reference to FIG. 5, the magnetic structure (shield) 500 has excellent resistance to stray field effects from both vertical and horizontal fields as well as fields having components in both the horizontal and vertical plane. The shield 500 includes an extending or forward protruding portion 504, which extends toward the ABS surface 502. The forward protruding portion 504 preferably extends to and is exposed at the ABS surface, but may also be recessed from the ABS by some amount, and also preferably has a flat surface at the ABS 502. The protruding portion 504 is preferably formed at or near the center of the shield 502. The first and second notches 506, 508 formed at either side of the protruding portion form the lateral sides 510, 512 of the protruding portion 504, defining the width W1 of the protruding portion 504. The notches 506, 508 are preferably recessed 0.3 um to 8 um, or more preferably 0.3 um to 3 um. into the head 221 as measured from the ABS, defining a depth D1 of the forward protruding portion. The notches 506, 508 terminate at inner corners 514, 516, which may be sharp or rounded. The notches 506, 508 also form outer corners 513, 515, which also may be sharp or rounded.

The shield 502 also includes first and second laterally extending recessed portions 518, 520 that extend laterally outward from the notches 506, 408. The laterally extending recessed portions 518, 520 each have a front edge 522, 524 which may have some sort of contour, but is preferably straight. The amount of recess of the laterally extending portions at their inner end is D1. This amount of recess of the laterally extending portions 518, 520 may be essentially constant along the length of the laterally extending portion 518, 520 or may vary.

The shield 500 has a back edge 526, that includes a backward extending portion 528. The backward extending portion 528 extends from the back edge 526 of the shield 500 in the direction away from the ABS 502. First and second notches 530, 532 form first and second laterally opposed side walls 534, 536 of the backward extending portion 528. The sides surfaces 534, 536 preferably form an angle of 80-100 degrees or about 90 degrees with respect to the ABS 502.

With reference still to FIG. 5, the backward protruding portion 528 has a depth D2 measured from the ABS as the distance from the back edge 526 to the back edge 538 of the backward extending portion 528. The shield 500 has an overall depth D3 that is the distance, measured from the ABS, from the front edge of the forward protruding portion 504 to the back edge 538 of the backward protruding portion.

With continued reference to FIG. 5, the forward protruding portion has a width W1 measured along the ABS surface that is defined by the distance between the first and second laterally opposed sides 510, 506 formed by the notches 506, 508.

With continued reference to FIG. 5, the shield 500 has overall dimensions that include a lateral width W2 measured from the tip 525 of the first laterally extending recessed portion 518 to the tip 527 of the second laterally extending recessed portion 520. In addition, with continued reference to FIG. 5, the shield 500 has a thickness (not shown) oriented into the plane of the page. This thickness can vary, but is preferably 0.3 um-5 um. Although already mentioned above, it should be pointed out again that the magnetic structure 500 is being described herein in terms of a magnetic shield, but could be one of many other types of magnetic structures needed in a magnetic head either presently or in a future magnetic head. The backward protruding portion 528 can is preferably, but not necessarily, located near the center of the magnetic structure 500, and may have sides 534, 536 that are laterally aligned with the sides 510, 512 of the front extending portion 504. However, depending on design considerations, the sides 534, 536 of the back extending portion may not be laterally aligned with the sides 510, 512 of the front extending portion 504.

Although the embodiment above has been described as having a backward extending portion, in a more general sense the present invention is a magnetic structure 500 having a back edge 526 that is discontinuous. In other words the back edge 526 includes at least one step, such as the sides 530, 532, which keeps the back edge from forming a completely straight line from one lateral end 525 to the other 527. This discontinuity or step could be provided by one of many different configurations, such as a stepped down recess rather than an extending portion 528 or even as a series of steps, either away from or toward the ABS. Therefore, the present invention can be described as a magnetic structure having a back edge located away from the ABS that is discontinuous.

The discontinuities provided by the back notches or steps 530, 532 prevent the focusing of stray fields, especially from stray magnetic fields having a component perpendicular to the ABS 502. The presence of the notches or steps 530, 532 breaks the structure into a plurality of domains having a smaller lateral dimensions than the structure 500 as a whole. As those skilled in the art may appreciate, the separate domains having smaller lateral dimensions are harder to magnetically saturate, which makes them less likely to emit strong focused magnetic fields. This results in much less stray field writing, especially from magnetic fields having a component perpendicular to the ABS 502.

Figure 6:
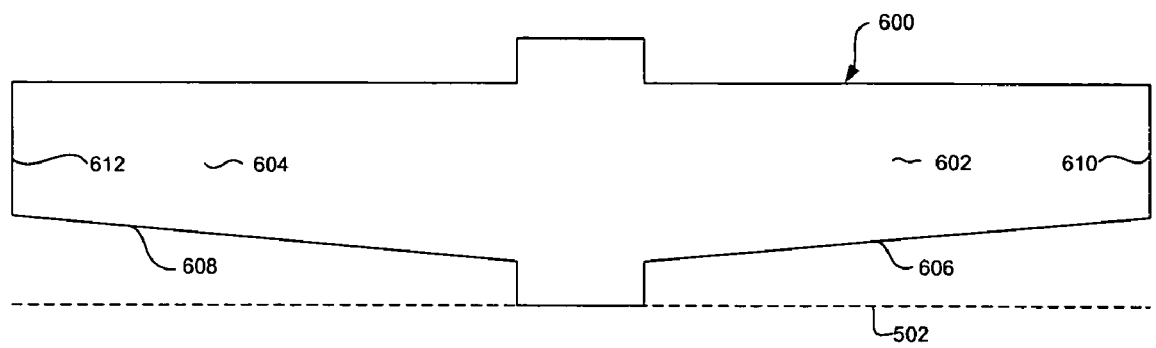
FIG. 6 is a view, similar to that of FIG. 5 of a magnetic structure according to an alternate embodiment of the invention.

With reference to FIG. 6, an alternate embodiment of the invention includes a shield 600 having laterally extending recessed portions 602, 604 with tapered front edges 606 608. The front edges are tapered so that the amount of recess increases with in increasing distance toward the lateral outer ends 610, 612 The slope of the tapered front edges 606, 608 can be defined as the change distance from the ABS 502 divided by a corresponding change in lateral distance. The taper of the lateral extending portions can further improve resistance to stray field writing by moving the outer corners of the laterally extended portions 606, 608 away from the ABS

502. Since the outer corners a location where magnetic flux will most likely focus, moving this point away from the ABS prevent a field emitted from the corners from magnetizing an adjacent magnetic medium. The tapered front edges 606, 608 are particularly useful for preventing stray field writing from stray magnetic fields having a component parallel to the ABS 502.

Figure 7:
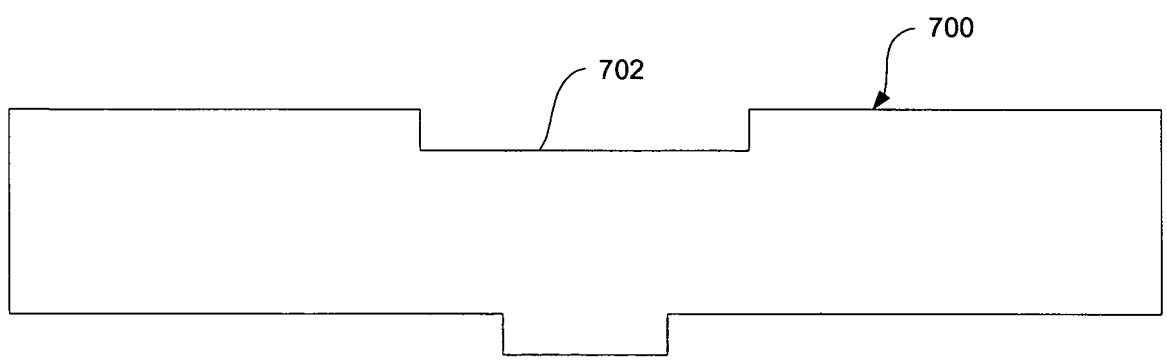
FIG. 7 is a view similar to that of FIG. 5 of a magnetic structure according to an alternate embodiment of the invention.

With reference now to FIG. 7, an alternate embodiment of the invention includes a magnetic structure 700, having a back edge notch or cavity 702. It should be pointed out that the present invention contemplates a structure having a back edge with a discontinuity generally. Therefore, the back edge could have a single step, a series of steps or any form of discontinuity that breaks the magnetic domains of the structure.

While various embodiments have been described above, it should be understood that they have been presented by way of example only, and not limitation. Other embodiments falling within the scope of the invention may also become apparent to those skilled in the art. For example although the invention has been described as being incorporated into a perpendicular recording system and would be particularly suited to use in such a system, the invention may be practiced in any magnetic recording system including a longitudinal magnetic recording system. Thus, the breadth and scope of the invention should not be limited by any of the above-described exemplary embodiments, but should be defined only in accordance with the following claims and their equivalents.

What is claimed is:

1. A magnetic structure for use in a magnetic recording head having an air bearing surface (ABS), the magnetic structure comprising:
    a structure formed of a CoFe alloy, the structure having:
    first and second laterally opposed ends;
    a back edge disposed away from the ABS;
    first and second notches formed in the back edge and defining a backward extending portion therebetween, the backward extending portion having first and second straight sides that form an angle of 80 to 100 degrees with respect to the ABS and that terminate at a backmost edge; and
    a front edge having third and fourth notches defining a forward extending portion therebetween, each of the third and fourth notches having a front edge that is substantially parallel with the ABS.

2. A magnetic structure as in claim 1 wherein each of the first, second, third and fourth notches defines a step.

3. A magnetic structure as in claim 1, wherein each of the first, second, third and fourth notches defines step forming a surface having an angle of about 90 degrees relative to the ABS.

4. A magnetic structure as in claim 1, wherein each of the first, second, third and fourth notches defines a step forming a surface having an angle of between 80 and 100 degrees with respect to the ABS.

5. A magnetic structure for use in a magnetic recording head having an air bearing surface (ABS), the magnetic structure comprising:
    the magnetic structure having:
    a forward extending portion extending toward the ABS and terminating at first and second laterally opposed sides;
    first and second laterally extending recessed portions extending from the first and second sides of the forward extending portion, the laterally extending recessed portions each having a front edge that is parallel with the ABS;
    a back edge disposed opposite the ABS and having a backward extending portion having first and second straight sides that form an angle of 80-100 degrees with respect to the ABS and that terminate at a backmost edge.

6. A magnetic structure as in claim 5, wherein the first and second sides of the backward extending portion each form an angle of about 90 degrees with respect to the ABS.

7. A magnetic structure for use in a magnetic recording head having an air bearing surface (ABS), the magnetic structure comprising:
    a magnetic structure constructed of a CoFe alloy, the magnetic structure having:
    first and second laterally opposed ends;
    a back edge disposed away from the ABS;
    first and second notches formed in the back edge and defining a backward extending portion therebetween, the backward extending portion having first and second straight sides that form an angle of 80 to 100 degrees with respect to the ABS and that terminate at a backmost edge; and
    a front edge having third and fourth notches defining a forward extending portion therebetween, each of the third and fourth notches having a front edge that is substantially parallel with the ABS.

8. A magnetic structure as in claim 7 wherein the first and second notches extend from the backward extending portion to the respective first and second laterally opposed ends of the magnetic structure.

9. A magnetic structure as in claim 7 wherein the first and second notches form first and second sides of the backward extending portion.

10. A magnetic structure as in claim 9 wherein each of the first and second sides has a surface that has an angle of 80 to 100 degrees with respect to the ABS.

11. A magnetic structure as in claim 9 wherein each of the first and second sides has a surface that has an angle of about 90 degrees with respect to the ABS.

12. A head assembly for use in a magnetic recording system, the head assembly comprising:
    a slider having an air bearing surface;
    a magnetic structure connected with the slider, the magnetic structure being constructed of a CoFe alloy, the magnetic structure having:
    first and second laterally opposed ends;
    a back edge disposed away from the ABS;
    first and second notches formed in the back edge and defining a backward extending portion therebetween, the backward extending portion having first and second straight sides that form an angle of 80 to 100 degrees with respect to the ABS and that terminate at a backmost edge; and
    a front edge having third and fourth notches defining a forward extending portion therebetween, each of the third and fourth notches having a front edge that is substantially parallel with the ABS.

13. A magnetic head assembly as in claim 12 wherein each of the third and fourth notches extends from the forward extending portion to one of the laterally opposed ends.

14. A magnetic head assembly as in claim 12, wherein the backward extending portion is disposed near the center of the magnetic structure as measured between the laterally opposed ends.

15. A magnetic head assembly as in claim 12 wherein the forward extending portion and the backward extending portion are both centrally disposed on the magnetic structure as measured from the laterally opposed ends.

16. A suspension assembly for use in a magnetic disk drive, comprising
- a suspension arm;
- a slider connected with the suspension arm, the slider having an air bearing surface;
- a magnetic structure connected with the slider, the magnetic structure being constructed of a CoFe alloy, the magnetic structure having:
  - first and second laterally opposed ends;
  - a back edge disposed away from the ABS;
  - first and second notches formed in the back edge and defining a backward extending portion therebetween, the backward extending portion having first and second straight sides that form an angle of 80 to 100 degrees with respect to the ABS and that terminate at a backmost edge; and
  - a front edge having third and fourth notches defining a forward extending portion therebetween, each of the third and fourth notches having a front edge that is substantially parallel with the ABS.

17. A suspension as in claim 16, wherein each of the first and second notches extends from the backward extending portion to one of the laterally opposed sides, and each of the third and fourth notches extends from the forward extending portion to a laterally opposed end.

18. A magnetic data recording system, comprising:
- a magnetic medium;
- an actuator;
- a slider connected with the actuator for movement adjacent to a surface of the magnetic medium; and
- a magnetic structure connected with the slider, the magnetic structure being constructed of a CoFe alloy, the magnetic structure having:
  - first and second laterally opposed ends;
  - a back edge disposed away from the ABS;
  - first and second notches formed in the back edge and defining a backward extending portion therebetween, the backward extending portion having first and second straight sides that form an angle of 80 to 100 degrees with respect to the ABS and that terminate at a backmost edge;
  - wherein the magnetic structure further comprises a front edge having third and fourth notches defining a forward extending portion therebetween, each of the third and fourth notches having a front edge that is substantially parallel with the ABS.

19. A magnetic data recording system as in claim 18 wherein each of the first and second notches extends from the backward extending portion to one of the laterally opposed sides.

20. A magnetic data recording system as in claim 18 wherein each of the third and fourth notches extends from the forward extending portion to a laterally opposed end.

* * * * *

UNITED STATES PATENT AND TRADEMARK OFFICE
CERTIFICATE OF CORRECTION

| | | |
|---|---|---|
| PATENT NO. | : 7,649,711 B2 | Page 1 of 1 |
| APPLICATION NO. | : 10/977446 | |
| DATED | : January 19, 2010 | |
| INVENTOR(S) | : Ho et al. | |

It is certified that error appears in the above-identified patent and that said Letters Patent is hereby corrected as shown below:

col. 9, line 66 replace "haying" with --having--.

Signed and Sealed this

Seventeenth Day of August, 2010

David J. Kappos
*Director of the United States Patent and Trademark Office*